US006581471B1

United States Patent
Grudzien

(10) Patent No.: US 6,581,471 B1
(45) Date of Patent: Jun. 24, 2003

(54) OUTPUT DEVICE FOR PRESSURE TRANSDUCER

(75) Inventor: Chris P. Grudzien, Lowell, MA (US)

(73) Assignee: MKS Instruments, Inc., Andover, MA (US)

( * ) Notice: Subject to any disclaimer, the term of this patent is extended or adjusted under 35 U.S.C. 154(b) by 0 days.

(21) Appl. No.: 09/998,292

(22) Filed: Nov. 30, 2001

(51) Int. Cl.$^7$ ................................................ G01L 9/00
(52) U.S. Cl. ........................................ 73/753; 73/756
(58) Field of Search ........................ 73/753, 718, 724, 73/146–146.8, 756, 866.3

(56) References Cited

U.S. PATENT DOCUMENTS

| | | | | |
|---|---|---|---|---|
| 4,748,861 A | * | 6/1988 | Matsumoto et al. | 73/866.3 |
| 6,105,437 A | * | 8/2000 | Klug et al. | 73/756 |
| 6,112,597 A | * | 9/2000 | Tschope | 73/756 |
| 6,119,524 A | * | 9/2000 | Kobold | 73/727 |

* cited by examiner

Primary Examiner—Hezron Williams
Assistant Examiner—Jermaine Jenkins
(74) Attorney, Agent, or Firm—Hale and Dorr LLP

(57) ABSTRACT

An output device for a pressure transducer incorporates a cable connector and an electronic display. Both may be selectably positioned relative to the pressure transducer. In one aspect of the invention, the electronic display is rotatable around an axis perpendicular to the plane of the display. In another aspect of the invention, the cable connector is positioned by adjusting the connection of the output device relative to the pressure transducer. In some embodiments, the adjustability of the output device is provided through a bayonet connection between the output device and the pressure transducer. The adjustments to position of the display and of the cable connector may be performed without the use of tools. An output device constructed in accordance with the present invention may be field-configured in a multitude of ways, largely eliminating the need for the preselection of particular output devices for particular installations.

12 Claims, 2 Drawing Sheets

OUTPUT DEVICE FOR PRESSURE TRANSDUCER

FIELD OF THE INVENTION

The invention relates generally to pressure transducers and specifically to output devices for pressure transducers.

BACKGROUND OF THE INVENTION

Pressure transducers are used for measuring the pressure of a fluid in a device or system. Pressure transducers may typically provide two types of outputs—(1) a cable connection for transmitting a signal representative of the sensed pressure to a remote monitoring or control device and (2) a human-readable display for providing a local reading of the sensed pressure.

Installation requirements for pressure transducers in the field may impose particular space or configuration requirements on the design of output devices for the pressure transducers. One use of a pressure transducer is to measure the pressure of a gas line. A pressure transducer is typically connected to a gas line such that it is perpendicular to the gas line. The connection between the pressure transducer and the gas line typically includes a passage for the fluid whose pressure is being measured, with a valve to an inlet to a sensing chamber in the transducer. When a pressure transducer is installed on a gas line, it is generally preferable that the passage provided in the connection be positioned so that it is parallel to the direction of flow in the gas line to avoid interruption of the flow. Accordingly, the position of the gas line will dictate the orientation of the pressure transducer. In many applications there are similar constraints on where a pressure transducer may be installed and how it may be positioned.

It is important that the cable connector and/or the display provided for output from a pressure transducer be accessible under various installation conditions. A local display should be oriented so that it is convenient and easy to read. A cable connector should be oriented so that it can easily be connected to the appropriate cable. When a pressure transducer is installed in the field, one or more sides of the pressure transducer may be obscured or obstructed, requiring the outputs to have particular orientations in order to be accessible. Limited vantage points might be available for viewing a display. In addition, under certain circumstances, a display having a particular orientation or a cable connector facing in a particular orientation may be especially desirable. It may be important for a number of displays to be aligned, for example, to form a "bank" of displays by positioning several transducers and their associated displays together on a set of gas lines. Given these requirements, pressure transducers having different configurations of cable connectors and local displays, particularly relative to the fluid passage of the pressure transducer, are generally needed for different applications. To satisfy this need, manufacturers have typically provided each type of transducer in several different configurations, each configuration having a unique placement, or orientation, of the display. However, carrying inventory for multiple configurations of the same transducer is expensive.

A measuring indicator device for a pressure transducer is disclosed in U.S. Pat. No. 6,119,524, entitled "Measuring Indicator Device," issued Sep. 19, 2000, to Kobold. The display disclosed in the '524 patent is screwed onto a casing. A pressure transducer and a line socket are connected on opposite sides of the casing. The casing is rotatable around its longitudinal axis. The position of the display can be adjusted by rotating the casing. Although the position of the display disclosed in the '524 patent may be adjusted, the disclosed design does not eliminate the need for providing multiple configurations of the same transducer. For example, FIGS. 1 and 2 of the '524 patent show two such configurations in which the display has been screwed into the casing at two different orientations which are rotated ninety degrees from one another.

An adaptable, easily adjustable output device for pressure transducers is needed.

SUMMARY OF THE INVENTION

The present invention is directed to an adjustable output device for pressure transducers and a method for installing and adjusting the output device. An output device constructed in accordance with the present invention may be field-configured in a multitude of ways, largely eliminating the need for preselecting particular output devices for particular installations. An output device constructed in accordance with the invention incorporates a cable connector and an electronic display. In one aspect of the invention, both the cable connector and the electronic display can be selectably positioned relative to the pressure transducer.

In one aspect of the invention, the orientation of the electronic display relative to the cable connector is adjustable. The electronic display is adjustable such that the digits of the display can generally be viewed right-side up or in the orientation most convenient to the user, given the constraints of a particular installation. The electronic display is rotatable around an axis perpendicular to the plane of the display. In some embodiments of the invention, the output device is substantially cylindrical in form. One end of the output device connects to a pressure transducer. The electronic display is disposed on the opposite end of the output device. In some embodiments, the display is disposed transverse to the longitudinal axis of the output device so that it can be seen from above, e.g., by forming an endcap for a generally cylindrical output device. The display can be rotated around the longitudinal axis of the output device in some embodiments. The orientation of the display can be adjusted without the use of tools and without taking apart the device or removing mechanical fasteners such as screws.

In another aspect of the invention, the orientation of the cable connector relative to the pressure transducer is adjustable. In one aspect of the invention, the output device may connect to the pressure transducer in a number of orientations. The orientation of the output device relative to the pressure transducer selects the orientation of the cable connector. In some embodiments, the cable connector is positioned on the side of the output device. The position of the output device may be changed without the use of tools. In some embodiments, the adjustability of the output device is provided through a bayonet connection between the output device and the pressure transducer.

These and other features and advantages of the present invention will become readily apparent from the following detailed description, wherein embodiments of the invention are shown and described by way of illustration of the best mode of the invention. As will be realized, the invention is capable of other and different embodiments and its several details may be capable of modifications in various respects, all without departing from the invention. Accordingly, the drawings and description are to be regarded as illustrative in nature and not in a restrictive or limiting sense, with the scope of the application being indicated in the claims.

BRIEF DESCRIPTION OF THE DRAWINGS

For a fuller understanding of the nature and objects of the present invention, reference should be made to the following detailed description taken in connection with the accompanying drawings, wherein.

DETAILED DESCRIPTION OF THE PREFERRED EMBODIMENTS

Figure 1:
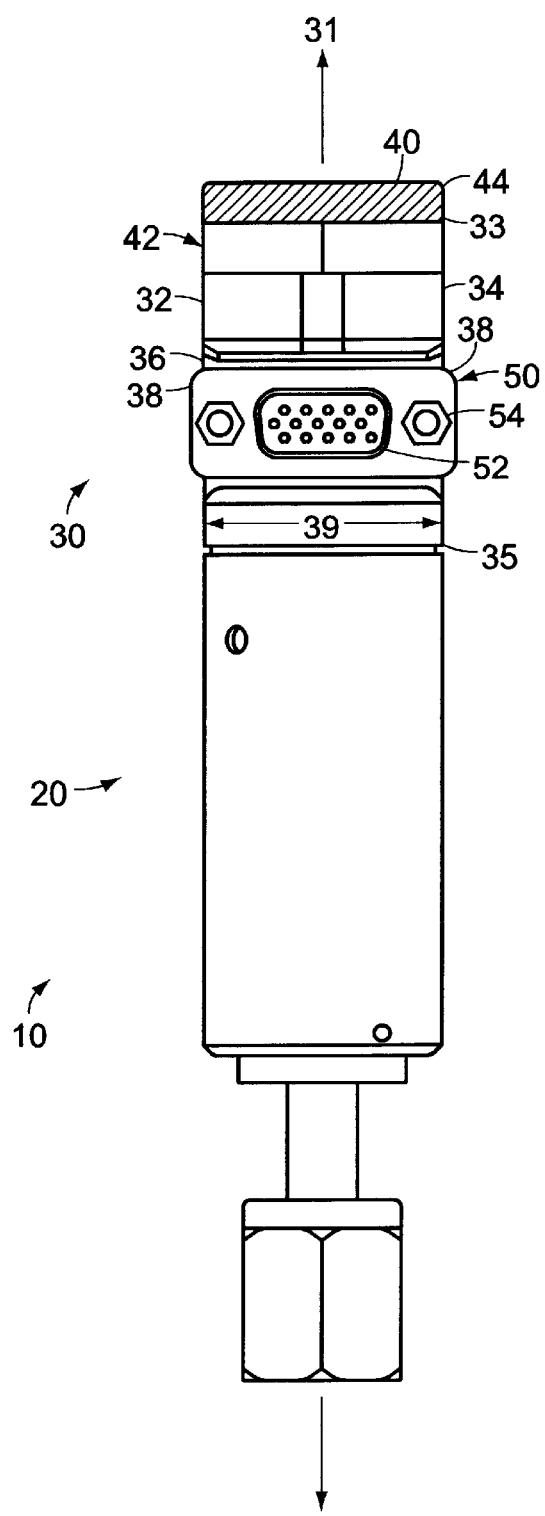
FIG. 1 is a side view of a pressure transducer assembly including an output device constructed in accordance with one embodiment of the invention.
Figure 2:
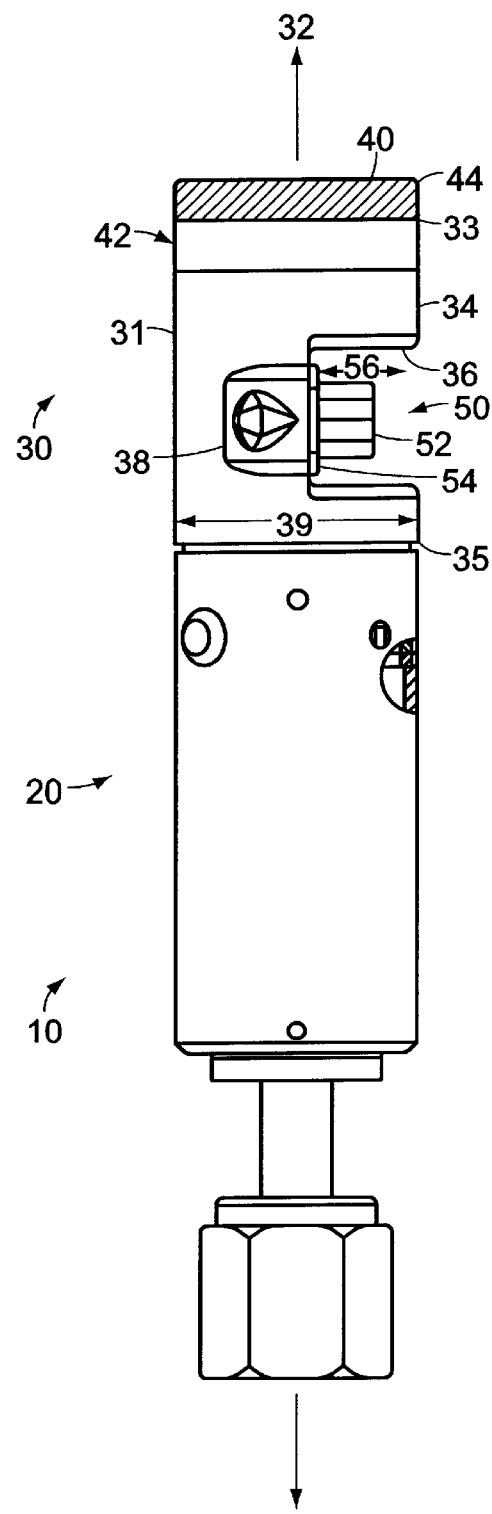
FIG. 2 is a side view of the pressure transducer assembly of FIG. 1.

FIGS. 1 and 2 show one example of an output device 30 constructed according to the invention. As shown, output device 30 is coupled to a pressure transducer 20. Transducer 20 and output device 30 form at least part of a transducer assembly 10. The output device 30 is designed to provide a conveniently adjustable output mechanism for pressure transducer 20 that is usable in a range of installation situations. Output device 30 includes a housing 31, an electronic display 40, and a cable connector 50. An electrical signal representing the pressure measurement taken by the pressure transducer 20 is provided through the output device 30 for local display on electronic display 40 and for remote use through cable connector 50. The output device 30 allows both the orientation of the cable connector 50 relative to the pressure transducer 20 and the orientation of the electronic display 40 to be adjusted.

The electronic display 40 is rotatably connected to the housing 31 so that the display 40 can be rotated relative to housing 31 about an axis perpendicular to the plane of the display 40. Preferably, the two types of outputs 40, 50 provided through the output device 30 both have a range of positions and may be adjusted independently, allowing a virtually infinite number of configurations to be implemented using the output device of the present invention.

Figure 3:
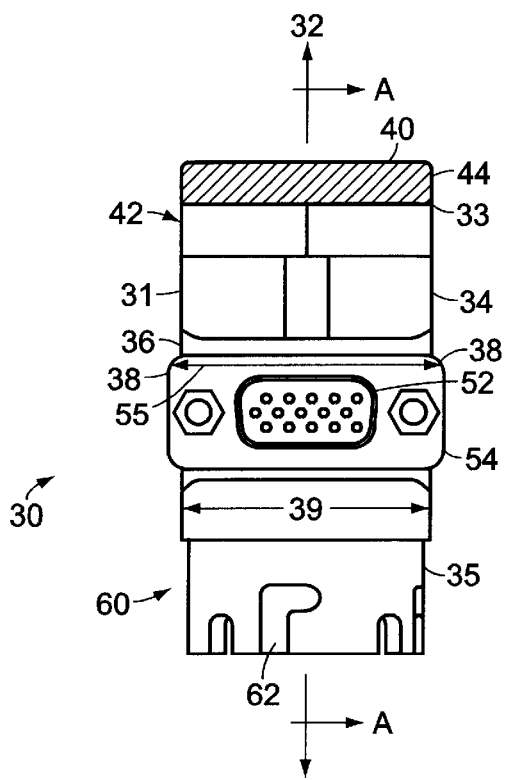
FIG. 3 is a side view of the output device of FIG. 1.
Figure 4:
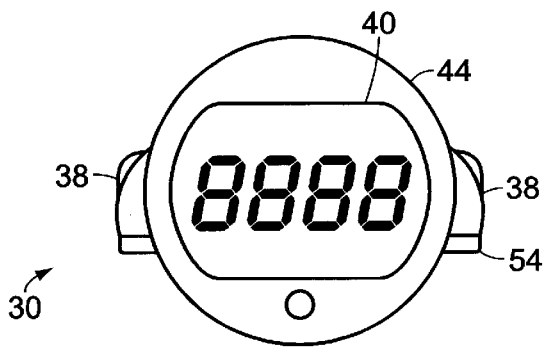
FIG. 4 is a top view of the output device of FIG. 3.
Figure 5:
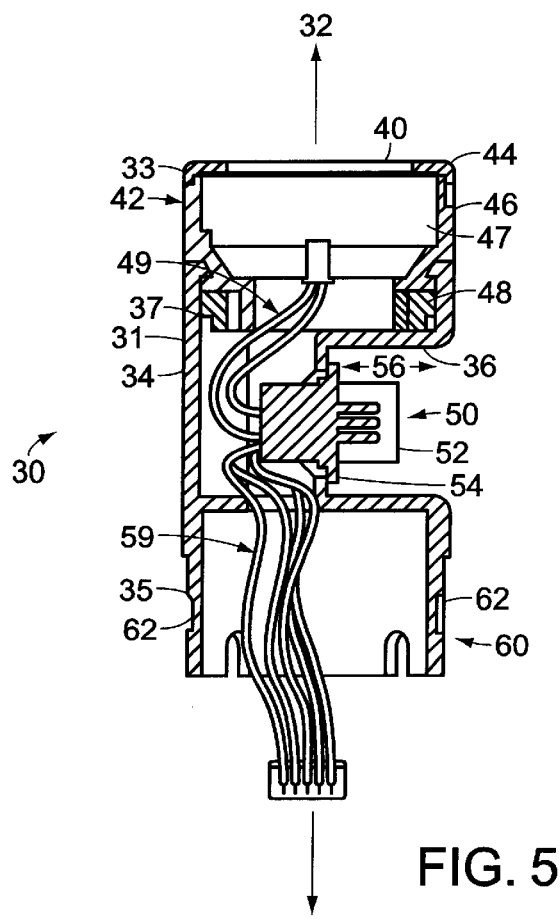
FIG. 5 is a cross-sectional view of the output device of FIG. 3, taken along the lines A—A indicated in FIG. 3.

In certain embodiments, the basic shape of the output device 30 is designed to match the dimensions and form of the pressure transducer 20. The pressure transducer 20 may be cylindrical in form, as illustrated in FIGS. 1 and 2. FIGS. 3, 4 and 5 are illustrations of the output device 30, shown detached from the pressure transducer 20. In the illustrated embodiment, the output device 30 is also substantially cylindrical in form. Housing 31 has a first end 33, a sidewall 34 and a second end 35, and housing 31 extends along a longitudinal axis 32.

In the illustrated embodiment, the electronic display 40 is mounted on one end of the housing 31. The cable connector 50 is mounted on the sidewall 34. On its other end 35, the housing 31 connects to the pressure transducer 20 with a pressure transducer connection 60. In the illustrated embodiment, the output device 30 attaches to the top of a pressure transducer 20, on the end opposite to the pressure transducer's fluid inlet, such that the output device 30 and pressure transducer 20 are coaxial along the longitudinal axis 32. The circular cross-sections of the output device 20 and the pressure transducer 20 may have substantially the same dimensions. This arrangement allows the entire pressure transducer assembly 10 to have a compact and integrated profile.

In the illustrated embodiment, the electronic display 40 is provided on the end 33 of the housing 31 that is opposite to the pressure transducer connection 60, such that it forms an endcap for the top of the output device 30. The display 40 is substantially planar and is disposed so that it is transverse to the longitudinal axis 32. In particular, in the illustrated embodiment, the display is disposed so that it is perpendicular to the longitudinal axis 32 of the housing 31. The positioning of the display 40 allows it to be viewed from above the pressure transducer assembly 10, e.g., looking toward the output device along the longitudinal axis 32 of the housing 31. This is especially convenient when the installation of the pressure transducer assembly is underground, low to the ground, or obscured from the side. The display 40 is disposed so that it may be rotated relative to the housing 31 around an axis perpendicular to the face of the display 40. In the illustrated embodiment, the display 40 is perpendicular to the longitudinal axis 32 of the housing 31 and can be rotated around the longitudinal axis 32. The rotatability of the display 40 allows the display 40 to be adjusted so that it may be read in the desired or most convenient orientation. One advantage is a reduction in the risk of human error in reading the displayed pressure measurement.

The face of the display 40 in accordance with some embodiments of the invention is shown in FIG. 4. In the illustrated embodiment, the top of the housing 31 includes a bezel 44 with the electronic display 40 disposed in the bezel 44. In some embodiments, the display 40 can be rotated up to about 360 degrees around the axis 32. The display 40 may be rotatable continuously or in small increments through its range of rotation. In some embodiments, the display 40 may be adjusted by holding the bezel 44 and rotating it, without the use of tools. The bezel 44 may have a textured, e.g., ridged, surface to allow for ease of gripping for rotating the bezel. Since the display 40 is rotatable with respect to housing 31, the orientation of display 40 may be adjusted without manipulating the connection of the output device 30 to the pressure transducer 20.

As noted above, display 40 is rotatably coupled to housing 31. That rotatable coupling may be provided using a variety of mechanisms, such as friction connections, grip ring, or ratchet-type connections. A single mechanism can provide both attachment of the display 40 to the housing 31 and rotation of the display 40. As may be seen in the cross-sectional view of FIG. 5, in some embodiments, the upper portion of the housing 31 may form a detachable electronic display unit 42. The electronic display unit 42 incorporates the electronic display 40, the bezel 44, and a display electronics assembly housing 46 for a display electronics assembly 47 that generates and controls the electronic display 40. In the illustrated embodiment, the electronic display unit 42 has a grip ring 48 at its base. The grip ring 48 is friction fitted to the inner sidewall 37 of the main portion of the housing 31. The grip ring 48 frictionally couples the electronic display unit 42 to the main portion of the housing 31 and permits the unit 42 to be rotated relative to housing 31 about the longitudinal axis 32. A detent disposed on the inner sidewall 37 of the housing 31 can prevent hyperrotation of the display 40 to avoid, for example, twisting the wires that connect to the display electronics assembly 47 sufficiently to damage the wires or break one of their electrical connections. The electronic display unit 42 may be replaced by a blank endcap if a local display is not desired for a particular installation.

The electrical connections inside the output device can be seen in the cross-section of FIG. 5. The electronic display 40 may be any type of electronic display, such as an LCD display or an LED display, including a loop-controlled or a voltage-controlled LED display. The display electronics assembly 47 receives a signal representative of the sensed pressure from the pressure transducer through wires 49 and generates the reading seen in the electronic display 40. The display electronics assembly 47 may include a microprocessor and may allow for calibration, and other adjustments, such as the units of measurement used in the display, of the electronic display 40. The electronic display 40 may include a control panel to allow for field adjustment of the electronic display 40.

In the illustrated embodiment, the cable connector 50 is mounted to the sidewall 34 of the housing 31. Although, in the illustrated embodiment, cable connector 50 is a sub-D connector, any desired type of cable connector 50, standard or custom-designed, may be used. The position of the cable connector 50 relative to the pressure transducer can be adjusted by rotating the housing 31 around the longitudinal axis 32 relative to the pressure transducer 20 so that the cable connector 50 has the desired direction.

In certain embodiments, the housing 31 of the output device 30 is dimensioned both to match the dimensions of the pressure transducer and to accommodate the cable connector 50 in the desired orientation. Cable connector 50 includes a face 52 and a mounting plate 54. The cable connector 50 may be mounted so that the face 52 of the connector 50 does not protrude from the sidewall 34 of the housing 31. In the illustrated embodiment, the cable connector 50 is mounted in a recess 36 in the sidewall 34 of the housing 31 to preserve the substantially cylindrical and compact shape of the housing 3 1. The recess 36 is built into the housing 31 to accommodate the depth 56 of the cable connector 50 and has a flat back wall for attachment of the mounting plate 54 of the cable connector 50. Although the cable connector 50 could be affixed to the housing 31 in a number of orientations, the cable connector 50 is preferably oriented with its longest dimension either along the longitudinal axis (a vertical orientation) or perpendicular to the longitudinal axis (a horizontal orientation). The longest dimension of the illustrated cable connector 50 is its width 55. Attaching the cable connector 50 in a vertical orientation may disadvantageously require the length of the output device 30 along the axis 32 to be extended. The cable connector 50 shown is mounted with a horizontal orientation. However, in the illustrated embodiment, because the housing 31 is dimensioned to match the pressure transducer 30, the diameter 39 of the housing 31 is not wide enough to accommodate the width 55 of the cable connector 50. Accordingly, two protrusions 38 extend from the sidewall 34 of the housing 31, adjacent to the back wall of the recess 36, to support the mounting plate 54 of the cable connector 50 without substantially altering the cylindrical profile of the housing 31, as can be seen in FIGS. 2 and 3. Depending on the characteristics of the connector used for particular embodiments, the housing 31 may be appropriately dimensioned to provide the desired positioning for the connector. The cable connector 50 may be attached to the housing 31 by mechanical or adhesive means, for example, screws or glue. An aperture is provided in the recess 36 of the housing 31 to allow for electrical wires or leads to attach to the back of the cable connector 50 inside the housing 31. In the illustrated embodiment, the cable connector 50 receives a signal representative of the sensed pressure from the pressure transducer through wires 59, which can be seen in FIG. 5. The wires 49, 59 to the display electronics assembly 47 and to the cable connector 50 may also be used, for example, to supply power and send and receive other signals, which may, for example, be generated by front end electronics, from the pressure transducer 20.

In some embodiments, the housing 31 selectably and detachably connects to pressure transducer 20 at its bottom end 35. As shown in FIG. 3, the end 35 may be implemented as a bayonet type connector 60, which defines one or more slots 62 for facilitating a bayonet connection between end 35 and transducer 20. In such embodiments, posts in transducer 20 (not shown) engage slots 62 in a known fashion to selectably couple or release output device 30 and transducer 20. In the illustrated embodiment, bayonet connector 60 defines four slots 62 (only one of which is shown in FIG. 3) and the slots are evenly spaced apart from one another (or spaced at 90 degree intervals) around end 35. In this embodiment, the output device 30 may be connected to transducer 20 in any one of four different orientations (i.e., each of the orientations being rotated by 90 degrees from another one of the possible orientations).

In this embodiment, the orientation of cable connector 50 with respect to transducer 20 may be selected simply by coupling the posts of transducer 20 into the appropriate slots 62 of bayonet connector 60. If it is desired, for example, to rotate the position of cable connector 50 by ninety degrees, the output connector 30 may simply be detached from transducer 20, rotated ninety degrees, and then reattached via the bayonet connector. It will be appreciated that additional flexibility in selecting the orientation of cable connector 50 may be provided if desired by adding additional slots 62 to bayonet connector 60 (e.g., six slots may be provided with all slots being spaced apart by sixty degrees). The bayonet connection is readily field-adjustable without the use of tools. Once the cable connector 50 has been located in a desired orientation, the electronic display 40 can be independently adjusted, or rotated, to obtain the desired orientation.

The illustrated embodiment provides two-degrees of freedom for adjusting the configuration of an output device for a pressure transducer. Because both the cable connector 50 and the local display 40 are readily adjustable, the output device 30 may be readily adapted to a multitude of installation situations.

An output device constructed in accordance with the present invention may be combined with pressure transducers of any type. The display may be disposed so that it is transverse but not perpendicular to the longitudinal axis of the output device. Although the illustrated embodiment incorporates and is designed to accommodate a sub-D cable connector, embodiments of the present invention could also be constructed using any type of cable connector. Other types of connections, including other type of bayonet connections, for the output device or other types of connections for the electronic display may be used in alternate embodiments. While the present invention has been illustrated and described with reference to particular embodiments thereof, it will be apparent that modifications can be made and the invention can be practiced in other environments without departing from the spirit and scope of the invention, set forth in the accompanying claims.

I claim:

1. An output device for a pressure transducer, comprising:
 a housing, including a first end adapted for connection to the pressure transducer;
 an electronic display attached to a second end of the housing, the electronic display being substantially disposed in a plane, the electronic display being rotatable relative to the housing about an axis perpendicular to the plane by a rotatable mechanism; and a cable connector attached to a side of the housing, the direction of the cable connector relative to the pressure transducer being adjustable.

2. The output device of claim 1, the housing having a longitudinal axis and the plane of the electronic display being perpendicular to the longitudinal axis, wherein the electronic display being rotatable around the longitudinal axis.

3. The output device of claim 1, wherein the electronic display is rotatable by about 360 degrees.

4. The output device of claim 1, wherein the electronic display is attached to the housing with a friction fit connection.

5. The output device of claim 4, wherein the friction fit connection includes a grip ring.

6. The output device of claim 4, wherein the friction fit connection includes a ratchet-type assembly.

7. The output device of claim 1, wherein the first end of the housing includes a bayonet connection.

8. The output device of claim 7, wherein the bayonet connection includes four slots.

9. The output device of claim 1, the cable connector having a depth, wherein the cable connector is attached in a recess in the housing, the recess being at least as deep as the depth of the cable connector.

10. The output device of claim 1, wherein the first end includes a bayonet connection and wherein the direction of the cable connector is adjustable by said bayonet connection.

11. A method of configuring an output device including a cable connector and a local electronic display for a pressure transducer for a particular installation, comprising the steps of:

determining a desired direction for the cable connector;

selecting an orientation for the output device relative to the pressure transducer to provide the desired direction for the cable connector;

completing a bayonet connection between the output device and the pressure transducer according to the selected orientation;

determining a desired orientation for the electronic display; and rotating the electronic display around an axis perpendicular to the plane of the electronic display until the desired orientation is achieved.

12. A method of adjusting an output device including a cable connector and a local electronic display for a pressure transducer for a particular installation, comprising the steps of:

unlocking a bayonet connection between the output device and the pressure transducer from a first position;

determining a desired direction for the cable connector;

selecting an orientation for the output device relative to the pressure transducer to provide the desired direction for the cable connector;

completing the bayonet connection between the output device and the pressure transducer according to the selected orientation in a second position;

determining a desired orientation for the electronic display; and rotating the electronic display around an axis perpendicular to the plane of the electronic display until the desired orientation is achieved.

* * * * *